Feb. 6, 1968  T. W. CONRAD  3,367,428
PNEUMATICALLY ACTUATED IMPACT TOOL
Filed Feb. 9, 1966
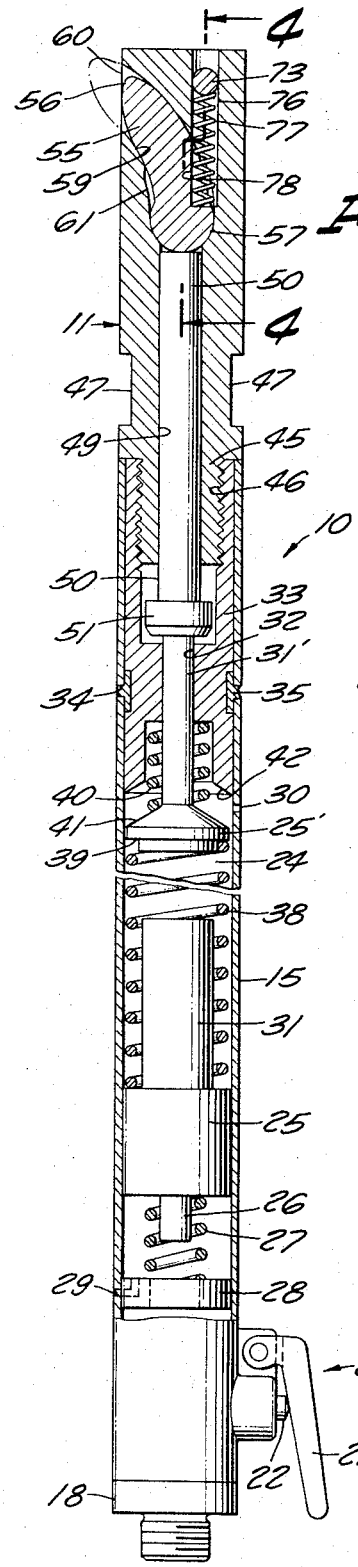
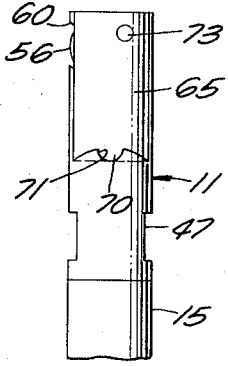
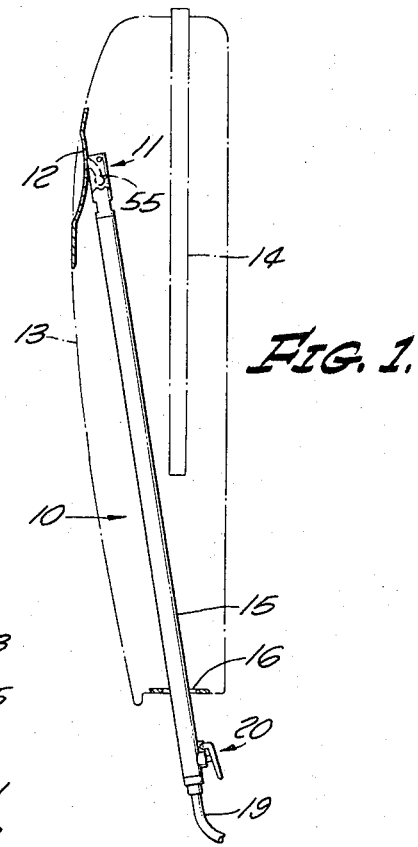
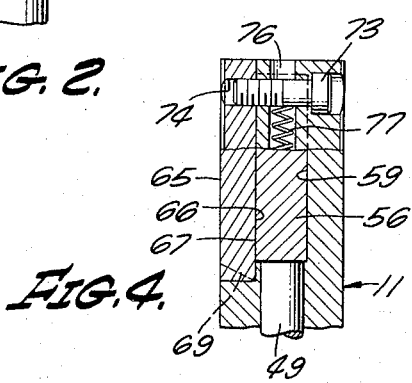
INVENTOR.
THOMAS W. CONRAD
BY
ATTORNEY United States Patent Office 3,367,428
Patented Feb. 6, 1968

3,367,428
PNEUMATICALLY ACTUATED IMPACT TOOL
Thomas W. Conrad, 2368 Oliveras St.,
Altadena, Calif. 91001
Filed Feb. 9, 1966, Ser. No. 526,238
10 Claims. (Cl. 173—102)

This invention relates to power tools and more particularly to an improved high-performance pneumatically actuated impact tool especially designed for use in cramped quarters and locations usually considered inaccessible to tools.

There is provided by the present invention an unusually lightweight, easily manipulated power tool of unusually small cross-section capable of being maneuvered into extremely small areas without diminishing its effectiveness to deliver a powerful blow in a direction extending crosswise of the tool. A typical example of an operating environment where there is need for a tool having these characteristics is damaged and deformed vehicle bodies. It not infrequently occurs that an automobile body receives inwardly extending indentations in doors, side wall panels, trunk assemblies and other areas where it is substantially impossible to admit tools with sufficient room for their effective manipulation. In consequence, it is necessary to resort to costly and objectionable operations such as the disassembly of the components, the replacement of the subassembly having a damaged part with a new one, or to employ plastic surgery of the damaged area.

Attempts have been made heretofore to provide tools designed to enter cramped quarters in efforts to restore the indented sheet metal work to its original configuration from the inner side of the damaged area. Included in such tools as proposed heretofore have been those employing impact principles. However, such tools as heretofore provided possess only limited usefulness because the desired stroke takes place axially through the end of the tool rather than transversely thereof as is desirable under many operating conditions. Prior attempts to provide such tools have not been successful.

According to this invention, there is provided a high-impact tool having a long small-diameter main body housing a normally retracted reciprocal hammer capable when activated to deliver a powerful impact blow through reciprocal transmitter means operatively associated with a specially designed hardened pick means operable through an arc extending laterally crosswise of the tool end. In its normal retracted position the work-performing end of the pick is substantially withdrawn within its operating passage in the tool end. During its operating movement, this pick is projected powerfully along an arcuate passageway formed crosswise of the tool end with its outer end extending laterally from the side of the tool to impart a sudden and powerful impact blow against a workpiece surface positioned close to or in engagement with the working end of the tool. High pressure air admitted to the supported end of the tool provides the motivating force under the control of a suitable air admission valve. Once the blow has been imparted, the valve may be closed and the used air released to the atmosphere as the moving components are readied for a repeat operation.

A feature of the design is the provision of a plurality of reciprocal parts, including the impact pick, all of which are provided with independent stops positioned to arrest the extension movement of each in sequence thereby restricting and limiting the load required to be absorbed by any particular stop surface. The impact end of the tool is particularly critical in design where it is important that a maximum power capability be developed in a minimum size and weight tool. The pick is noncircular in cross-section and its longitudinal axis is arcuate shape and fits loosely but accurately within a similarly shaped supporting passage having its inner end extending axially of the tool body and its outer end opening laterally through the side wall of the tool head. The inner end of this pick is enlarged to provide a stop surface and is preferably arc-shaped crosswise of its inner end to provide a low friction seating surface in contact with the end of a driver plunger. The seating passageway for the pick opens laterally through one of its side walls and is normally closed by a cover plate having interlocking engagement with the tool body so as to require but a single retainer fastener to hold the cover assembled. This fastener serves additionally as an anchorage for one end of the pick retraction spring.

Accordingly, it is a primary object of the present invention to provide an improved high-efficiency, high-performance, high-impact tool having a multiplicity of applications and adapted to be powered from a supply of pressurized air.

Another object of the invention is the provision of a powerful impact tool capable of delivering a working blow crosswise of one end of the tool.

Another object of the invention is the provision of a pneumatically operated impact tool useful in delivering a powerful short blow in cramped quarters laterally from the side of the tool.

Another object of the invention is the provision of an impact tool having a minimum number of operating parts cooperating with air pressure to deliver a short but powerful blow to an impact member operating along an arcuate path extending generally crosswise of one end of the tool.

Another object of the invention is the provision of a highly versatile impact tool particularly useful in relieving internal stresses in deformed sheet metal and the like members as an incident to restoration of the metal to its original shape after being damaged.

These and other more specific objects will appear upon reading the following specification and claims and upon considering in connection therewith the attached drawings to which they relate.

Referring now to the drawings in which a preferred embodiment of the invention is illustrated.

FIGURE 1 is a fragmentary partially schematic view showing a preferred embodiment of the invention tool in use in a typical operating environment interiorly of a vehicle door assembly to straighten a dent in the outer panel thereof;

FIGURE 2 is a fragmentary view on an enlarged scale of the forward end of the tool shown in FIGURE 1;

FIGURE 3 is a longitudinal cross-sectional view of the tool in an enlarged scale with a portion of its length broken away; and FIGURE 4 is a fragmentary sectional view along line 4—4 of FIGURE 3.

Referring initially more particularly to FIGURE 1, there is shown a preferred embodiment of the impact tool, designated generally 10, positioned with its head end 11 in position to impart impact blows to a dent 12 in a vehicle door generally indicated in cross-section by the dot-and-dash lines 13. As is well known, such door structures include a metal frame, inner and outer sheet metal panels or coverings suitably braced and having provision for a vertically movable window indicated at 14 as well as operating mechanisms for the window and for the door latch, not shown. Tool 10 includes a small diameter tubular main body 15 of sufficient length to reach remote interiors of car door panels and the like sections of the vehicle from available access areas or openings and is sufficiently rigid to hold the tool head 11 firmly against a surface to be worked, such as the interior of the dented area 12. Owing to the small diameter of the tool and the absence of protrusions along its length it is easily insertable into the interior of car bodies—usually without need for disassembly of any except possibly minor dress components or by drilling a small hole 16 in an edge of some invisible part as the lower edge of the door frame.

The simplicity of the tool construction is made apparent by FIGURE 3 illustrating the several components in their normal retracted position. Main body 15 is provided at its inlet end with a threaded coupling 18 for coupling to a flexible hose 19 connectable to a source of pressurized air at, say, 90 to 100 p.s.i. A suitable control valve 20 is normally closed and includes an operating handle 21 and a valve actuating plunger 22.

The major length of main body 15 provides a piston chamber 24 slidably supporting a piston 25 having a rearwardly extending boss 26 extending into one end of a small buffer spring 27. The opposite end of this spring may be suitable supported as by a spider ring 28 secured to tube 15. As herein shown, this spider and the adjacent portion of the tube are provided with a bleeder passage 29 for venting air from the cylinder at the end of each operating cycle. A similar bleeder vent 30 is formed in the side wall of tube 15 at its forward end and permits the escape of air trapped forwardly of piston 25. Piston 25 and its forwardly extending shank 31 have substantial mass since the power of the blow imparted by the impact tool is dependent upon the weight and velocity of this piston during its forward stroke.

A second and cooperating piston-like member 25' has a shank section 31' slidably supported in an axial bore 32 of a fitting 33. Fitting 33 is secured within the forward end of tube 15, as by silver solder 35 applied through openings 34 in main body 15. A long light-strength coil spring 38 has one end encircling shank 31 of piston 25 and its other end seated in a shouldered recess 39 of piston 25'. A short, light coil spring 40 encircles shank 31' of piston 25' and urges it to the retracted position shown, whereas spring 38 cooperates in holding both of pistons 25 and 25' in their respective retracted positions illustrated in FIGURE 3. It will be understood that piston 25' has a very loose fit in tube 15 since its operation is not dependent upon the pressure differential across its opposite ends but rather upon the impact blow imparted thereto by main piston 25. The length of its operating movement is determined by the distance between its forwardly facing surface 41 and the cooperating stop surface 42 on the adjacent end of fitting 33.

Tool head 11 is formed from very tough high-strength material, as tool steel, and has a threaded shank snugly mating with a threaded well 46 extending axially into the forward end of fitting 33. Flats 47 formed on the opposite sides of head 11 permit the head to be wrenched into tight assembly relation with fitting 33. Slidably supported in an axial bore 49 of the head is a plunger 50 having a head 51 and is normally retracted with head 51 seated firmly against the forward end of piston shank 31'. The permissible travel of plunger 50 before head 51 strikes the adjacent end of threaded shank 45 is desirably a few thousandths of an inch less than the permissible travel of piston 25'.

The blow imparting tool proper 55, herein designated a pick, is noncircular in cross-section, as square or rectangular, and of arcuate configuration lengthwise thereof. This pick is formed of the toughest material and is provided with a pointed outer end 56 and with a slightly enlarged cylindrical inner end 57 normally in contact with the forward end of plunger 50. Pick 55 has a loose sliding fit within a complementally shaped passage 59 opening laterally at 60 through the side wall of head 11. The inner end 61 of passage 59 is enlarged to freely accommodate pick enlargement 57. The merger of the forward end of enlargement 61 with passage 59 is so shaped as to provide a stop engageable with the forward end of pick enlargement 57 thereby limiting the extension movement of the pick during its operating cycle. Desirably, the length of travel permitted by passage 61 is a few thousandths of an inch in excess of that permtited piston 50.

It will be understood that noncircular passage 59 must be formed in an appropriate manner as by a milling tool extending laterally into head 11 from the left side thereof as viewed in FIGURE 4. A preferred mode of constructing head 11 is to mill away one side thereof to a depth substantially merging with the near side wall of the arcuate passage 59 for pick 55. Thereafter, passage 59 and its enlarged inner end 61 is formed by appropriately designed milling cutters. Thereafter, these passages are closed by a cover 65 (FIGURES 2, 4). As herein shown, this cover has a flat inner surface fitting flush against the corresponding surface 67. It will be understood that surfaces 66 and 67 lie generally flush with the adjacent flat side of pick 56 while seated in passages 59 and 61. The outer surface of cover 65 is arcuate with the same diameter as head 11 and tube 15. Its rearwardly facing end 69 is beveled to interlock with a complementary bevel formed in head 11. Additionally, cover 65 is provided with a rearwardly projecting semi-circular boss 70 (FIGURE 2) which seats in a complementally shaped recess 71 formed in the aforedescribed beveled rear end of cover 65. By reason of the described interfitting bosses and beveled surfaces it will be clear that the rear end of cover 65 cannot move outwardly away from tool head 11 because of the cooperating bevel surfaces and cannot move either to the right or left crosswise of the head, as viewed in FIGURE 2, by reason of the interlocking boss 70 and recess 71. For these reasons, a single fastener screw 73 extending transversely through head 11 and into threaded opening 74 of cover 65 is entirely adequate to hold the cover in assembled position. Screw 73 extends transversely through a bore 76 opening through the end of head 11 (FIGURE 3) and serves as an anchorage for a light coil retraction spring 77 for pick 55. It will be understood that the side of pick 55 adjacent spring 77 is formed with a shallow recess 78 having a shoulder seating the inner end of the spring. It will therefore be apparent that the single fastener screw 73 has the dual functions of holding the cover in assembled position and providing a stop and assembly anchorage for retraction spring 77.

The operation of the invention impact tool will be quite apparent from the foregoing detailed description of its components and their operating relationship to one another. Let it be assumed that the tool is to be used to straighten a dent 12 in the outer side of a vehicle door. The tool is connected to the air source through hose 19 and inserted through any available opening or through a hole 16 made for that purpose in the lower edge of the door frame. The head end 11 of the tool is then inserted into the interior of the door assembly until the pointed outer end 56 of pick 55 is positioned against the inner surface of bulge 12. The tool is then held firmly in this position and preferably pressed against the area to be impacted. While so held, valve 20 is suddenly depressed allowing a large volume of pressurized air to enter the tool body rearward of piston head 25. This causes piston 25 to be accelerated lengthwise of the tool body at high velocity and under a pressure of some 90 to 100 p.s.i. As piston 25 reaches its maximum velocity substantially at the end of an appropriate operating stroke of one foot, its power is imparted to hammer piston 25' and thereby to plunger 50 and pick 55. All three of these components, being in direct contact with the one another in their retracted positions, move forward simultaneously under the full power imparted thereto by main piston 25. Each of these three parts comes to rest sequentially with hammer piston 25 stopping first, piston 25' second, then plunger 50, and finally pick 55. Pick 55 may or may not engage its stop surface at the end of passage 61 depending upon the amount of energy absorbed by the workpiece as it is struck by the pick.

Valve handle 21 need be depressed only for the very brief period required to accelerate piston 25 to a maximum following which the valve is released and closes automatically. The air admitted to the tool during this operation then bleeds to the atmosphere by way of bleeder passages 29 and 30 as the several springs within the tool cooperate in returning each of the components to its retracted position in readiness for the next operating cycle.

As will be appreciated from the foregoing, the very powerful blow imparted to the inner end of the pick acts to accelerate the latter through an arcuate path extending generally transversely of the tool head. In consequence, the inner end of the pick travels essentially lengthwise of the tool whereas the outer end travels in a path essentially transversely of the tool. This provides a highly efficient and effective manner of translating longitudinal movement into lateral movement with minimum energy loss and minimum wear of the parts. Of particular importance, all components can be made to a minimum size yet maximum strength, thereby assuring the tool of a rugged, long service life. The provision made for stopping movement of the various components sequentially and in a predetermined order minimizes the stress and strain on the several parts.

It will be understood that the working end 56 of pick 55 may have various configurations depending upon the purpose and work to be performed. As herein shown, the blunt, pointed end 56 is found highly effective in forming small indentations in sheet metal deformations and found effective in relieving internal stresses and facilitating restoration of such deformations to their original configurations. Once this has been accomplished by a series of small indentations concentrated in the most highly stressed areas of the deformation undergoing straightening, the tips of the indentations may be machined away and the straightened surface polished and refinished in accordance with known technique.

While the particular pneumatically actuated impact tool herein shown and disclosed in detail is fully capable of attaining the objects and providing the advantages hereinbefore stated, it is to be understood that it is merely illustrative of the presently preferred embodiments of the invention and their no lmitations are intended to the details of construction or design herein shown other that as defined in the appended claims.

I claim:

1. A high-performance pneumatically actuated impact tool adapted for use in both close and open quarters in delivering powerful blows from the side of the tool, said tool comprising an elongated main body having a diameter which is fractional compared to its length and formed with a piston chamber axially thereof, piston means slidably supported in said chamber and including spring means normally holding said piston in retracted position, tool head means axially of one end of said main body provided with an axial circular bore communicating at its inner end with an open-sided noncircular passage opening at its outer end through the side wall of said tool head, a noncircular hardened pick slidably mounted in said passage and including spring means normally holding the same retracted adjacent the inner end of said passage, plunger means slidably supported in said circular bore with one end against the inner end of said retracted pick and its other end in position to be struck by said piston means after being accelerated by pressurized air applied to the end thereof remote from said plunger means, cover means covering the open side of said noncircular passage means, and means for supplying pressurized air to said piston chamber at the end thereof remote from said tool head.

2. An impact tool as defined in claim 1 characterized in that the inner portion of said noncircular passage for said pick is inclined at a relatively small angle to the axis of said plunger means.

3. An impact tool as defined in claim 1 characterized in that said spring means for retracting said pick is substantially smaller in cross-section than said pick and located laterally to one side of said pick with one end bearing against said pick and acting to urge the pick to its retracted position.

4. An impact tool as defined in claim 1 characterized in that the inner end of said noncircular passage is enlarged to accommodate an enlargement on the inner end of said pick, the opposite ends of the enlarged end of said passage cooperating with the juxtaposed surfaces of said pick enlargement to limit the to-and-fro movement of said pick.

5. An impact tool as defined in claim 1 characterized in that said cover means and said tool head have interfitting surfaces and being so contoured when held mated as to prevent relative movement of said tool head and cover means in two planes, and single fastener means for preventing relative movement of said cover means and tool head in a third plane lying generally at right angles to said two first mentioned planes.

6. An impact tool as defined in claim 1 characterized in that the enlargement at the inner end of said pick is generally cylindrical in the area thereof in contact with the adjacent end of said plunger means.

7. An impact tool as defined in claim 1 characterized in that said noncircular passage and said pick are arcute shaped and having their respective radii centering at a common point spaced laterally to one side of said tool.

8. A high-performance pneumatically actuated impact tool adapted for use in both close and open quarters in delivering powerful blows from the side thereof, said tool comprising an elongated main body having a diameter which is fractional compared to its length and formed with a piston chamber axially thereof, piston means slidably supported in said chamber and including spring means normally holding said piston in retracted position, tool head means axially of one end of said main body provided with an axial circular bore opening at its inner end into a noncircular arcuate passage opening at its outer end through the side wall of said tool head closely adjacent the outer end thereof, a noncircular hardened arcuate pick slidable lengthwise of said arcuate passage and including spring means normally urging said pick to its retracted position, plunger means having a head on the end remote from said pick slidably mounted in said axial bore with its other end bearing against the inner end of said pick, the inner end of said tool head including means located in the path of the headed end of said plunger and cooperating therewith to limit the travel of said plunger under the impact of said piston means, and means for admitting pressurized air to said piston chamber on the end thereof remote from said tool head.

9. An impact tool as defined in claim 8 characterized in that said piston means is formed in first and second separate reciprocable sections slidably supported in said main housing, spring means interposed between and tending to hold said first and second sections spaced apart, and spring means acting on the first piston section closest to said plunger means effective to urge both of said piston sections toward the retracted positions thereof and in position to impart an impact blow to said plunger means and to said pick as the second one of said piston sections approaches the high velocity end of its operating stroke.

10. An impact tool as defined in claim 9 characterized in that said first piston section includes an enlargement on the end thereof adjacent said second piston, and means carried by said main body positioned in the path of said enlargement and cooperating therewith to limit the travel thereof when struck by said second piston section.

References Cited

UNITED STATES PATENTS

| | | | |
|---|---|---|---|
| 532,780 | 1/1895 | Hardy | 173—148 |
| 2,694,435 | 11/1954 | Lund | 173—121 |
| 2,720,802 | 10/1955 | Geller | 173—133 |
| 3,286,558 | 11/1966 | Hufnagel | 173—133 |
| 3,326,303 | 6/1967 | Jones | 173—102 |

FRED C. MATTERN, Jr., *Primary Examiner.*

L. P. KESSLER, *Assistant Examiner.*